(12) United States Patent
Heller et al.

(10) Patent No.: US 11,997,485 B2
(45) Date of Patent: May 28, 2024

(54) SYSTEMS AND METHODS FOR RADIO FREQUENCY TRANSMISSION SOURCE DETECTION

(71) Applicant: Endpoint Security, Inc., College Station, TX (US)

(72) Inventors: R. Page Heller, College Station, TX (US); Jay T. Labhart, Katy, TX (US)

(73) Assignee: ENDPOINT SECURITY, INC., College Station, TX (US)

( * ) Notice: Subject to any disclaimer, the term of this patent is extended or adjusted under 35 U.S.C. 154(b) by 0 days.

(21) Appl. No.: 18/285,164

(22) PCT Filed: Mar. 18, 2022

(86) PCT No.: PCT/US2022/020955
§ 371 (c)(1),
(2) Date: Sep. 29, 2023

(87) PCT Pub. No.: WO2022/212091
PCT Pub. Date: Oct. 6, 2022

(65) Prior Publication Data
US 2024/0089733 A1    Mar. 14, 2024

Related U.S. Application Data

(60) Provisional application No. 63/169,740, filed on Apr. 1, 2021.

(51) Int. Cl.
*H04W 12/06* (2021.01)
*H04W 12/79* (2021.01)

(52) U.S. Cl.
CPC .......... *H04W 12/06* (2013.01); *H04W 12/79* (2021.01)

(58) Field of Classification Search
CPC .............................. H04W 12/06; H04W 12/79
See application file for complete search history.

(56) References Cited

U.S. PATENT DOCUMENTS 7,120,562 B1 * 10/2006 Wilson .................... G06F 18/00
706/26
2007/0264939 A1 * 11/2007 Sugar ................... H04B 17/309
455/67.11

(Continued)

FOREIGN PATENT DOCUMENTS

WO    2020068198 A2    4/2020

*Primary Examiner* — Brandon J Miller
(74) *Attorney, Agent, or Firm* — Johnson, Marcou, Isaacs & Nix, LLC; John S. Sears

(57) ABSTRACT

This disclosure provides systems, methods, and apparatus for determining whether an incident radio-frequency (RF) signal is from a known transmission source based on a match between a signature of the incident RF signal and at least one stored signature. One or more antennas can generate a plurality of electrical signals corresponding to a portion of a pulse of the incident RF signal. At least one of amplitude or phase values of a first electrical signal and phase coherent second electrical signal can be determined in the frequency domain. The signature of the incident RF signal based on at least one of amplitude or phase values of the first and the second electrical signals can be determined. This signature can be compared with stored signatures to determine whether the incident RF signal is from a known transmission source.

24 Claims, 8 Drawing Sheets

(56) References Cited

U.S. PATENT DOCUMENTS

2016/0366586 A1* 12/2016 Gross ................. H04L 63/0876
2017/0019193 A1*  1/2017 Pratt ..................... H04B 17/12
2017/0131335 A1   5/2017 Pratt et al.
2020/0366373 A1  11/2020 Hand

* cited by examiner

SYSTEMS AND METHODS FOR RADIO FREQUENCY TRANSMISSION SOURCE DETECTION

CROSS REFERENCE TO RELATED APPLICATIONS

This application is the 35 U.S.C. § 371 national stage application of PCT Application No. PCT/US2022/020955, filed Mar. 18, 2022, where the PCT claims priority to, and the benefit of, U.S. Provisional Application No. 63/169,740, entitled "Systems and Methods for Radio Frequency Transmission Source Detection," filed Apr. 1, 2021, both of which are herein incorporated by reference in their entireties.

TECHNICAL FIELD

This disclosure relates to the field of radio frequency (RF) transmissions, and in particular to determining identities of sources of incident RF signals.

DESCRIPTION OF THE RELATED TECHNOLOGY

RF transmission systems can include one or more transmitters and one or more receivers. One approach to detecting whether a RF signal received at a receiver is transmitted from a known or trusted transmitter is to demodulate the modulated data in the received RF signal and determine the identity of the transmitter from the data. The identity can include a code of some kind or an assigned network address. The receiver can compare the identity with stored identities associated with known or trusted transmitters. If there is a match, the receiver can determine that the RF signal originated from a known or trusted transmitter.

The identity of the transmitter shown in the data may be in the form of measurements taken from integrated circuit response times in the transmitting device. These recorded timing features can sometimes distinguish individual transmitters.

In either case, the receiver must be programmed with knowledge of how to decode the received information comprising the identity of the transmitter. The receiver, therefore, is made specific to the transmitting devices it is to encounter.

SUMMARY

In some aspects, the techniques described herein relate to a method for identifying incident RF signals at a receiver. The method includes receiving, via at least one antenna, a plurality of electrical signals corresponding to a portion of a pulse of an incident RF signal, the portion of the pulse of the incident RF signal having a duration that is less than a duration of a single pulse of the incident RF signal; determining at least one of amplitude or phase values of a first electrical signal and a second electrical signal in phase coherence with the first electrical signal, from the plurality of electrical signals, in a plurality of frequency bins in the frequency domain; determining a signature of the incident RF signal based on at least one of amplitude or phase of the first electrical signal and the second electrical signal in each of the plurality of frequency bins; determining that the incident RF signal is from a known transmission source based on a match between the signature of the incident RF signal and at least one signature stored in memory; and executing, responsive to determining that the incident RF signal is from a known transmission source, at least one action from a set of actions associated with the known transmission source.

In some aspects, the set of actions associated with the known transmission source includes, demodulating the modulated data included in the incident RF signal and annunciate at the receiver that the incident RF signal is from a known transmission source. In some aspects, the method further includes transforming the first electrical signal and the second electrical signal into corresponding frequency domain representations over a first set of frequency bins; and removing at least one of a group of low frequency bins or a group of high frequency bins from the first set of frequency bins to generate a second set of frequency bins; and selecting the plurality of frequency bins, over which the signature of the incident RF signal is determined, as the second set of frequency bins. In some aspects, a center frequency bin of the plurality of frequency bins aligns with a center frequency bin of the first set of frequency bins.

In some aspects, the method further includes determining the signature of the RF signal based on generating one of Stokes parameters or Jones vectors from at least one of amplitude and phase values of the first electrical signal and the second electrical signal in each frequency bin of the plurality of frequency bins. In some aspects, the method further includes determining the signature of the RF signal based on a summation or an average of one of Stokes parameters or Jones vectors over the plurality of frequency bins. In some aspects, determining that the incident RF signal is from a known transmission source based on the match between the signature of the incident RF signal and the at least one signature stored in memory includes determining that a correlation between the signature of the incident RF signal and the at least one signature stored in memory has a correlation coefficient that is greater than a threshold value.

In some aspects, the method further includes determining the correlation between the signature of the incident RF signal and the at least one signature stored in memory includes aligning a center frequency bin of the signature of the incident RF signal and a center frequency bin of the at least one signature stored in memory. In some aspects, the center frequency bin of the signature of the incident RF signal is determined based at least on determining two frequency bins having the highest two magnitudes in the second set of frequency bins, and setting the center frequency bin as a frequency bin that is between the two frequency bins and substantially equidistant from the two frequency bins.

In some aspects, the at least one antenna includes a first antenna and a second antenna spatially separated from the first antenna, and wherein the first electrical signal corresponds to a component of a signal generated by the first antenna responsive to the incident RF signal and the second electrical signal corresponds to a component of a signal generated by the second antenna responsive to the incident RF signal. In some aspects, the at least one antenna includes a single dual-polarized antenna, and wherein the first electrical signal and the second electrical signal correspond to polarized signal components the single dual-polarized antenna in response to the incident RF signal.

In some aspects, the method further includes determining the signature of the incident RF signal further based on at least one of signal bandwidth and polarization coordinates of a Poincare sphere of the first electrical signal and the second electrical signal in each of the plurality of frequency bins.

In some aspects, the techniques described herein relate to a method for identifying incident RF signals at a receiver, including: receiving, via at least one antenna, a plurality of electrical signals corresponding to an incident RF signal; transforming the first electrical signal and the second electrical signal, which is in phase coherence with the first electrical signal, into corresponding frequency domain representations over a first set of frequency bins; removing at least one of a group of low frequency bins or a group of high frequency bins from the first set of frequency bins to generate a plurality of frequency bins; determining a signature of the incident RF signal based on at least one of amplitude or phase of the first electrical signal and the second electrical signal in each of the plurality of frequency bins; determining that the incident RF signal is from a known transmission source based on a match between the signature of the incident RF signal and at least one signature stored in memory; and executing, responsive to detraining that the incident RF signal is from a known transmission source, at least one action from a set of actions associated with the known transmission source.

In some aspects, the set of actions associated with the known transmission source includes, demodulating the modulated data included in the incident RF signal and annunciate at the receiver that the incident RF signal is from a known transmission source. In some aspects, a center frequency bin of the plurality of frequency bins aligns with a center frequency bin of the first set of frequency bins. In some aspects, the method further includes determining the signature of the RF signal based on generating one of Stokes parameters or Jones vectors from at least one of amplitude and phase values of the first electrical signal and the second electrical signal in each frequency bin of the plurality of frequency bins. In some aspects, the method further includes determining the signature of the RF signal based on a summation or an average of one of Stokes parameters or Jones vectors over the plurality of frequency bins.

In some aspects, determining that the incident RF signal is from a known transmission source based on the match between the signature of the incident RF signal and the at least one signature stored in memory includes determining that a correlation between the signature of the incident RF signal and the at least one signature stored in memory has a correlation coefficient that is greater than a threshold value. In some aspects, the method further includes determining the correlation between the signature of the incident RF signal and the at least one signature stored in memory includes aligning a center of the signature of the incident RF signal and a center of the at least one signature stored in memory.

In some aspects, the center frequency bin of the signature of the incident RF signal is determined based at least on determining two frequency bins having the highest two magnitudes in the second set of frequency bins, and setting the center frequency bin as a frequency bin that is between the two frequency bins and substantially equidistant from the two frequency bins. In some aspects, the at least one antenna includes a first antenna and a second antenna spatially separated from the first antenna, and wherein the first electrical signal corresponds to a component of a signal generated by the first antenna responsive to the incident RF signal and the second electrical signal corresponds to a component of a signal generated by the second antenna responsive to the incident RF signal. In some aspects, the at least one antenna includes a single dual-polarized antenna, and wherein the first electrical signal and the second electrical signal correspond to polarized components of a signal of the single dual-polarized antenna in response to the incident RF signal.

In some aspects, the plurality of electrical signals correspond to a portion of a pulse of the incident RF signal, the portion of the pulse of the incident RF signal having a duration that is less than a duration of a single pulse of the incident RF signal. In some aspects, the method further includes determining the signature of the incident RF signal further based on at least one of signal bandwidth and polarization coordinates of a Poincare sphere of the first electrical signal and the second electrical signal in each of the plurality of frequency bins.

BRIEF DESCRIPTION OF THE DRAWINGS

Like reference numbers and designations in the various drawings indicate like elements.

DETAILED DESCRIPTION

Figure 1:
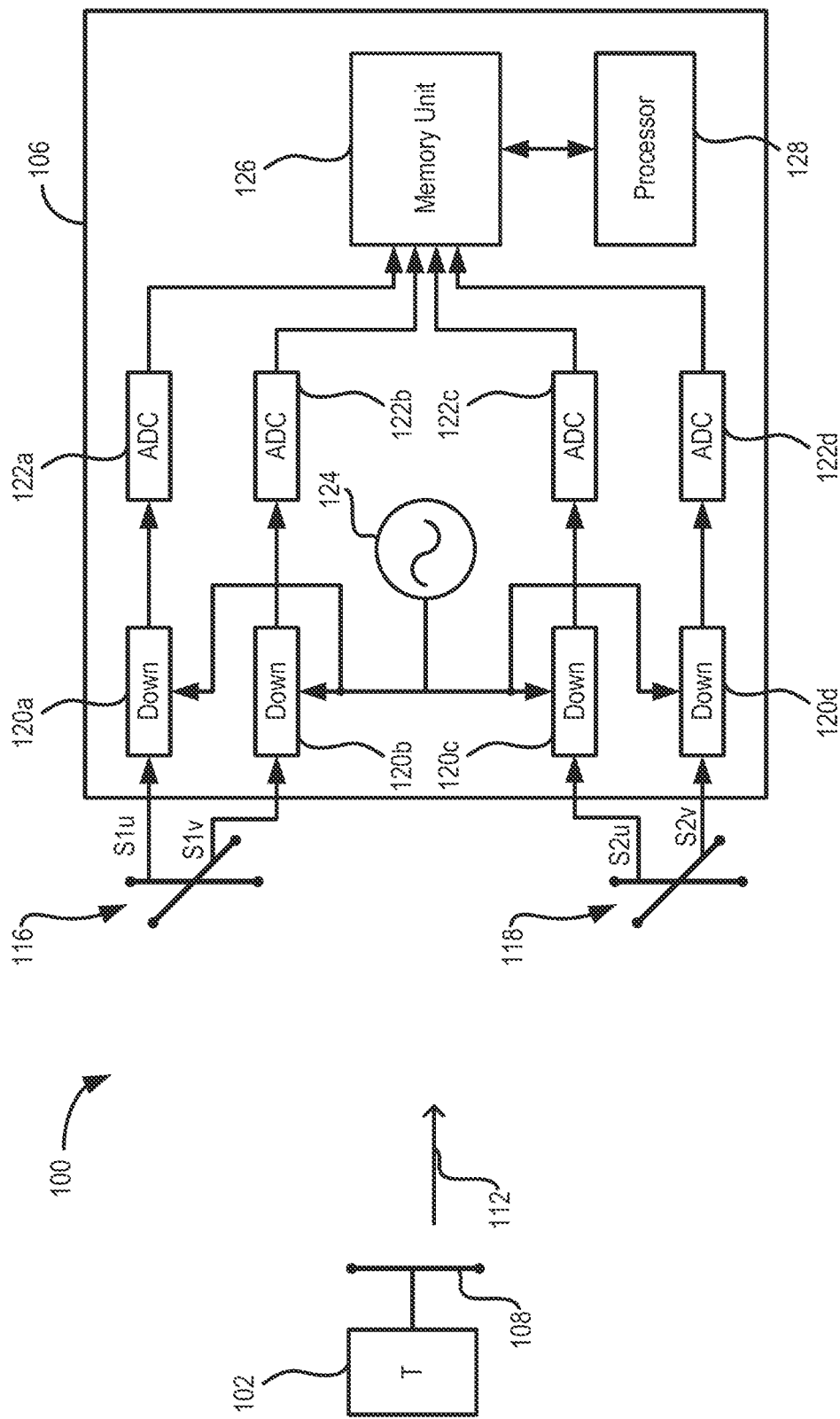
FIG. 1 shows a block diagram of an example wireless system.

The various concepts introduced above and discussed in greater detail below may be implemented in any of numerous ways, as the described concepts are not limited to any particular manner of implementation. Examples of specific implementations and applications are provided primarily for illustrative purposes.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the member or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g., the phrase "x to y" includes the range from 'x' to 'y' as well as the range greater than 'x' and less than 'y'. The range can also be expressed as an upper limit, e.g., 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Prior to describing the various aspects of the present disclosure, the following definitions are provided and should be used unless otherwise indicated. Additional terms may be defined elsewhere in the present disclosure.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used herein, the term "and/or" includes any and all combinations of one or more of the associated listed items. Expressions such as "at least one of," when preceding a list of elements, modify the entire list of elements and do not modify the individual elements of the list.

As used in the specification and the appended claims, the singular forms "a," "an" and "the" include plural referents unless the context clearly dictates otherwise. Thus, for example, reference to "a proton beam degrader," "a degrader foil." or "a conduit," includes, but is not limited to, two or more such proton beam degraders, degrader foils, or conduits, and the like.

The various concepts introduced above and discussed in greater detail below may be implemented in any of numerous ways, as the described concepts are not limited to any particular manner of implementation. Examples of specific implementations and applications are provided primarily for illustrative purposes.

As used herein, the terms "optional" or "optionally" means that the subsequently described event or circumstance can or cannot occur, and that the description includes instances where said event or circumstance occurs and instances where it does not. Unless otherwise specified, temperatures referred to herein are based on atmospheric pressure (i.e., one atmosphere).

Wireless communications involve at least one transmitter and at least one receiver. One aspect of secured communications is to identify and authenticate a transmission source at the receiver. A receiver can receive wireless transmissions from several sources, some of which may be trusted sources while others may not. In such instances it is desirable for the receiver to have the ability to identify trusted transmission sources. Some applications rely on the receiver to decode an identity of the transmitter from the modulated data included in the transmission signal. That is, the receiver receives the transmission from the transmission source, demodulates the data packets within the transmission, and compares the demodulated data with locally stored trusted transmission source information to determine whether the transmission source is a trusted transmission source. But this approach can result in a delay between the time the wireless transmission from the transmission source is first received to the time when the determination of the identity of the transmission source can be made. Such delays can be ill-suited for real-time determination of trusted transmission sources.

Some other approaches speed up the determination of the identity of the transmission source by relying on the properties of the transmission signal rather than on the modulated data carried by the transmission signal. Specifically, the receiver can determine the identity of the transmission source based on coherent signal dispersion information (which includes polarization mode dispersion information) of the electrical component of the transmission signal over various frequencies. Different transmission signals, in part due to the different transmission paths taken to arrive at the receiver, can have different coherent signal dispersion properties. The receiver can associate a transmission source with the coherent signal dispersion properties of the transmission signal received from that transmission source. To determine the identity of the transmission source of a new transmission signal received by the receiver, the receiver can determine the coherent dispersion properties and compare the properties with previously stored coherent dispersion properties of known or trusted transmission sources. If there is a match, the receiver can determine that the transmission signal is from a known or trusted transmission source. Examples of this approach are described in U.S. Pat. Nos. 10,707,975, 10,605,841, and WO/2020/068198, each of which is incorporated by reference herein in its entirety. While this approach is relatively more efficient than the one in which demodulation of data is carried out, the approach can still take longer than that desired in some applications.

The approach discussed herein provides fast detection of the identity of the transmission source based in part on coherent signal dispersion information. In particular, the receiver determines the coherent signal dispersion properties of the received signal based on a portion of a received signal pulse. The inventors have discovered that the ability of the receiver to determine the identity of the transmission source is not compromised by a reduction in the temporal length of the received signal pulse. As a result, the receiver can faithfully identify the transmission source even with a relatively short duration of the received signal pulse. This approach can reduce the time to identify the transmission source as well as reduce computational complexity. The approach herein further reduces the computational complexity by considering only a subset of frequency bins of Stokes parameters derived from the received portion of the signal pulse to determine the identity of the transmission source. By reducing the number of frequency bins, the computational complexity of the identity determination process can be reduced, thereby potentially speeding up the identification process even further.

FIG. 1 shows a block diagram of an example wireless system 100. In particular, the wireless system 100 includes a transmission source 102 and a receiver 106. The transmission source 102 transmits a radio-frequency (RF) signal 112 with a transmitting antenna 108. The transmitting antenna 108 can be arbitrarily polarized. The signal 112 can each include a series of pulses that embody the data transmitted from the transmission source 102. The signal 112 can traverse a multi-path channel from the transmission source 102 to the receiver 106. The receiver 106 can include two or more antennas for receiving the signal 112. For example, the receiver 106 includes a first receiver antenna 116 and a second receiver antenna 118. In some examples, the receiver 106 can include only one of the first receiver antenna 116 and the second receiver antenna 118. The first receiver antenna 116 or the second receiver antenna 118 can be a dual-polarized antenna—that is, each dual-polarized antenna includes two co-located orthogonal single pole antennas. The first single pole of a dual-polarized antenna can be referred to as a u-polarized antenna, and the second single pole antenna of the dual-polarized antenna can be referred to as a v-polarized antenna, where u and v can represent any pair of orthogonal polarizations, including vertical and horizontal, right- and left-hand circular, slant +45° and slant −45°, etc. Together, the first single pole antenna and the second single pole antenna can form a dual-polarized antenna. In some examples, both the first receiver antenna 116 and the second receiver antenna 118 can be dual-polarized antennas. In some examples, the first receiver antenna 116 or the second receiver antenna 118 can be single pole antennas. In instances where the first receiver antenna 116 is a single pole antenna and the second receiver antenna 118 is also a single pole antenna, the two antennas can be spatially separated and can be mutually orthogonally oriented. In some examples, the first receiver antenna 116 and the second receiver antenna 118 can be separated by at least 0.5 wavelength of the signal to be detected.

The multi-path channel can include one or more targets that may reflect, refract, diffract, scatter, or otherwise cause a signal to arrive at the receiver along multiple paths. Typically, multi-path channels can be undesirable as they may deteriorate the reception of the transmitted signal at the receiver. However, in some respects, the deterioration may aid in determining a signature of the transmission source. For example, the multi-path channel may modify a transmitted signal by introducing constructive or destructive interference with associated phase and amplitude complex scaling, time delay, frequency shifting, polarization changes, etc. These changes can be frequency dependent. That is, the changes, such as for example in polarization modes, can be different in different frequency sub-ranges of the signal spectrum. These changes can be specific to the combination of the transmission source and the multi-path channel that the signal, transmitted from that transmission source, traverses before arriving at the receiver antenna A receiver can therefore associate the specific changes in the polarization mode with a transmission source. When a new signal is received, and the polarization mode changes of the new signal match those associated with a known transmission source, the receiver can associate the new signal with the known transmission source.

The deterioration in the transmitted signal can manifest at the receiver as polarization mode dispersion (PMD) or coherent signal dispersion (CSD). The deterioration can manifest as PMD at the receiver when the receiver receives the transmitted signal over two co-located orthogonal antennas. If the two antennas are not co-located or are not orthogonally oriented, then the deterioration manifests itself as CSD. For example, PMD may be understood as a variation in the polarization state of the received signal as a function of the signal's frequency components. That is, the polarization states of the signal are distinctly altered for different frequency components of the received signal. In one example, the channel may couple vertically polarized waves into horizontally polarized waves on paths with different delays relative to the vertically polarized path. Electrical signals from two antennas responsive to an incident transmission signal can be processed to determine the polarization dispersion. Specifically, electrical signals from two antennas that are co-located and mutually orthogonal can be collected. Stokes parameters or Jones vectors of the pair of electrical signals can then be determined. The Stokes parameters or the Jones vectors can represent polarization information associated with the transmission signal. If the pair of electrical signals are from two antennas that are not co-located or are not mutually orthogonal, then the Stokes parameters and the Jones vectors do not describe polarization. However, the Stokes parameters or the Jones vectors can still represent CSD in the transmission signal.

Referring again to FIG. 1, each of the first receiver antenna 116 and the second receiver antenna 118 can generate two signals in response to the signal 112 or second signal 114. For example, the first receiver antenna 116 can detect orthogonally polarized components of the channel-modified version of the signal 112. The first receiver antenna 116 can generate two signals S1$u$ and S1$v$ corresponding, respectively, to the u-polarized component and the v-polarized component of the received signal. The u and v can represent any pair of orthogonal polarizations, including vertical and horizontal, right and left-hand circular, slant +4° and slant −45°, etc. Similarly, the second receiver antenna 118 can generate two signals S2$u$ and S2$v$ corresponding, respectively, to the u-polarized component and the v-polarized component of the same received signals as the first receiver antenna 116 (e.g., the signal 112). Down converters 120$a$-$d$ can down-convert the component signals, while the analog-to-digital converters (ADCs) 122$a$-$d$ can convert the down-converted analog component signals to corresponding digital signals. Each of the component signals can be connected to and controlled by a common local oscillator 124 and/or a common clock signal. Having a common local oscillator 124 for the down converters 120$a$-$d$ and a common clock for the ADCs 112$a$-$d$ can ensure that the component signals (S1$u$, S1$v$, S2$u$, and S2$v$) are at least in phase coherence with each other. In some instances, components including the down converters 120$a$-$d$ to the ADCs 122$a$-$d$ can be gain and phase matched across all frequency components of interest and that the local oscillator 124 signal gains are matched to each of the components. The digitized component signals (S1$u$, S1$v$, S2$u$, and S2$v$) can be stored in a memory unit 126, which can be accessed by one or more processors 128. The transmission source 102 and the receiver 106 can communicate RF signals associated with various communication technologies such as, for example, WiFi, Bluetooth, OFDM, etc.

Figure 2A:
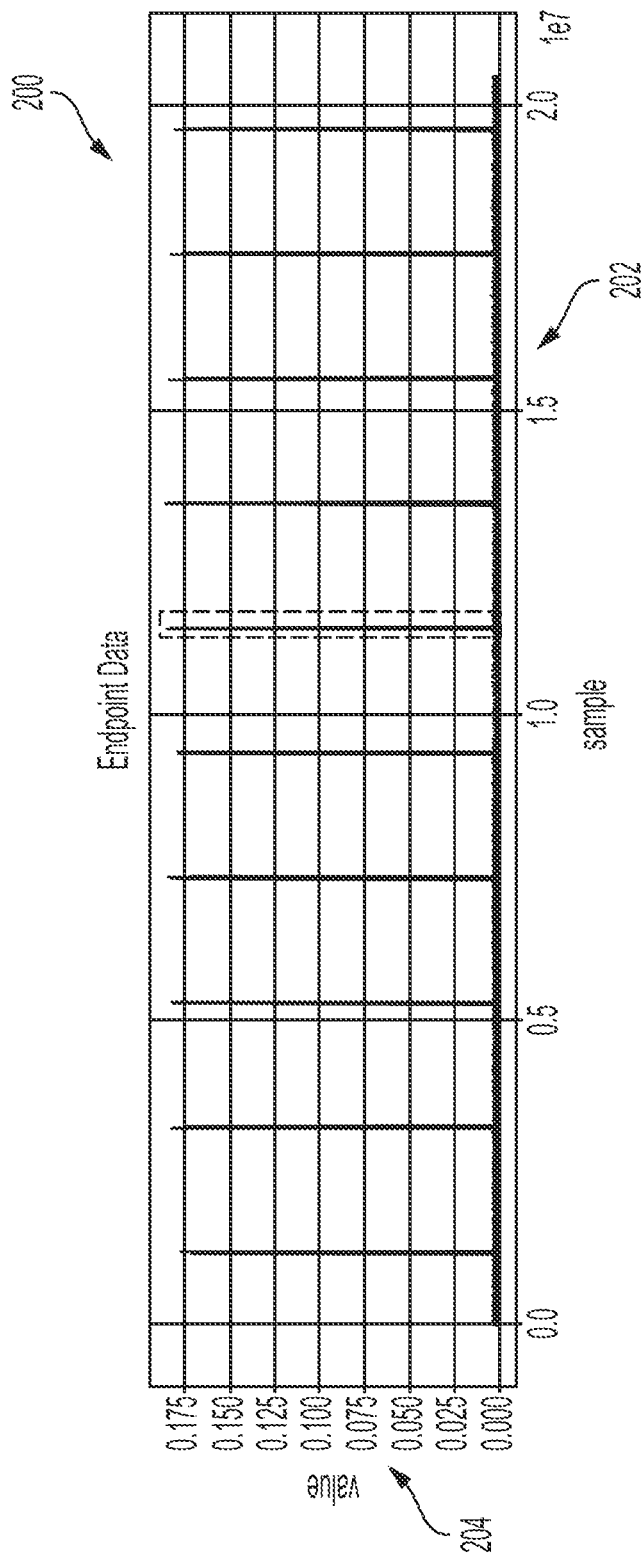
FIGS. 2A-2B show example waveforms of a digitized component signal.
Figure 2B:
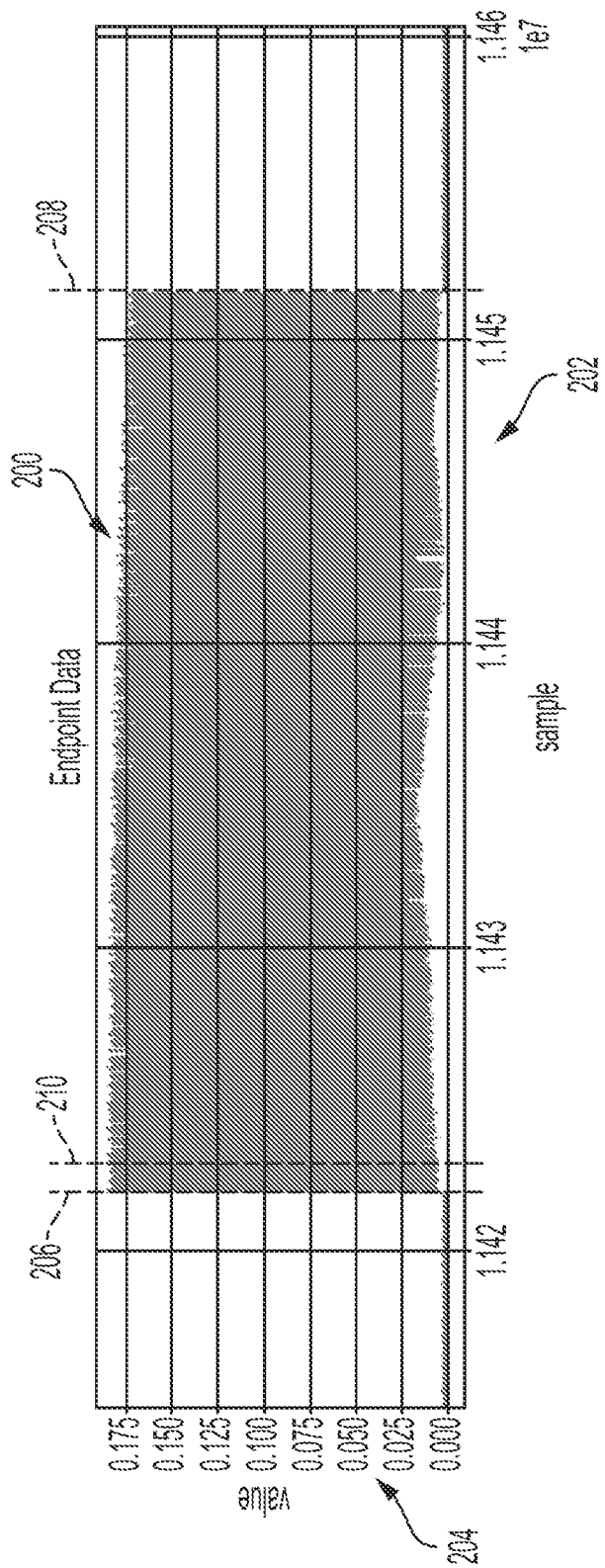

FIGS. 2A-2B show example waveforms of a digitized component signal. FIG. 2A shows a waveform 200 of a digitized component signal (e.g., S1$u$, S1$v$, S2$u$, or S2$v$), while FIG. 2B shows a close-up view of a portion of the waveform shown in FIG. 2A. The waveform 200 can be a digitized component signal corresponding to the signal 112 received from the transmission source 102. The x-axis 202 represents the number of digital samples, while the y-axis 204 represents the amplitude of the signal for each sample. The waveform 200 includes a series of pulses 202, each of which may include information transmitted by the transmission source 102. FIG. 2B shows an expanded view of one of the pulses in the waveform shown in FIG. 2A. The pulse can include a leading edge 206 and a trailing edge 208.

The one or more processors 128 may process only a portion of the component signals to determine the characteristics of the received signal 112. One approach to determining a signature of the signal 112 is to determine the Stokes parameters or Jones vectors based on a pair of component signals (S1$u$, S1$v$, S2$u$, and S2$v$) over a range of frequency bins. The signature of the signal 112 can then be correlated with stored signatures in memory to determine whether there is a match. With regards to correlation, it is generally considered that greater the time duration (or number of time samples) for which the original component signals are captured, the more confidence one can have on the correlation metric. However, the inventors have discovered that a good correlation metric can be obtained even with relatively small number of samples of the signal 112. Referring again to FIG. 2B, the conventional approach to determining the signature is to determine the Stokes parameters or Jones vectors of the entire pulse between the leading edge 206 and the trailing edge 208. But with this approach, the one or more processors 128 would have to process all the samples between the leading edge 206 and the trailing edge 208. Instead, the approach discussed herein allows the one or more processors 128 to consider only a portion of the pulse. For example, the one or more processors 128 may consider a portion between the leading edge 206 and an intermediate edge 210 to determine the signature of the signal 112.

Figure 3A:
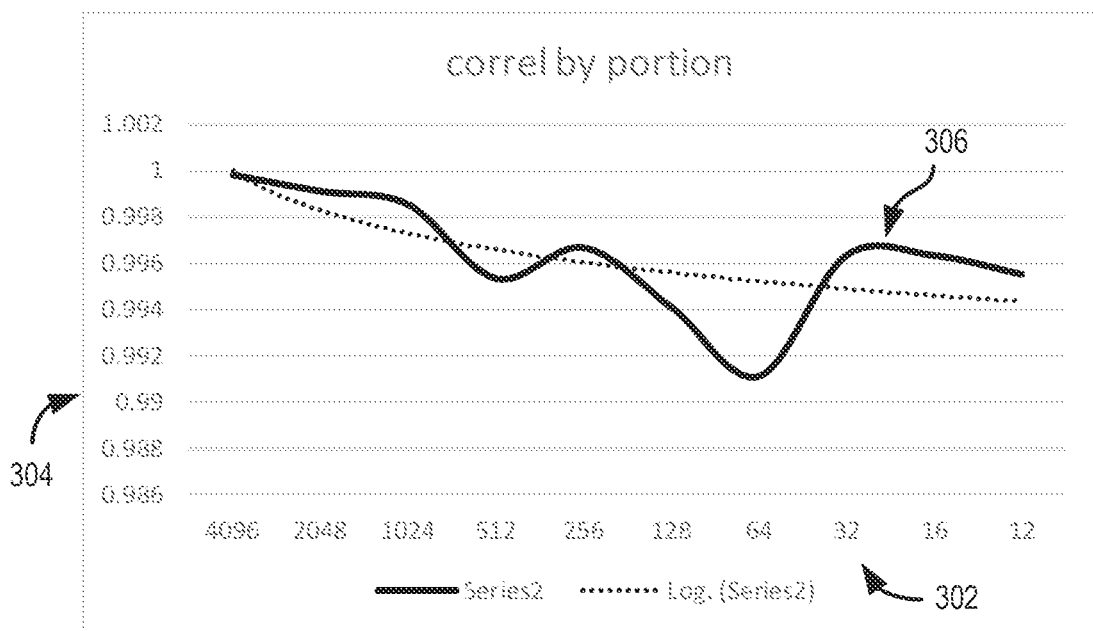
FIG. 3A shows a graph depicting the relationship between signature correlation and sample size of the signal.
Figure 3B:
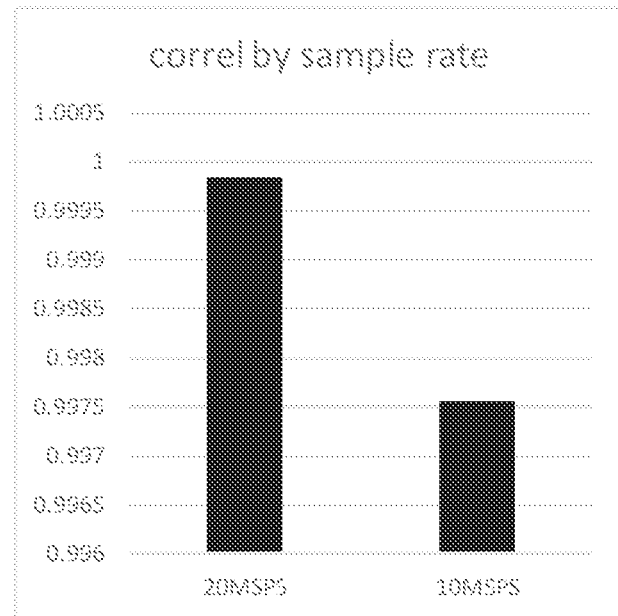
FIG. 3B shows a bar graph depicting the relationship between signature correlation and the sampling rate at which the samples of the signal are collected.

FIG. 3A shows a graph depicting the relationship between the correlation and sample size of the signal. In particular, FIG. 3A shows the degree of deterioration in the correlation between a signature of a signal stored in memory and a signature of the same signal determined using various sample sizes, where a sample size refers to the number of samples used for digitally representing a signal. The number of samples can change, for example, if for the same sampling rate the duration for which the signal is sampled is changed. The number of samples may also change if the duration remains the same, but the sampling rate is changed. In FIG. 3A, the x-axis 302 represents the sample size (same sampling rate but different durations for which the signal is sampled) of the signal used to determine the signature, and the y-axis 304 represents the correlation coefficient resulting from correlating the signature of the particular sample size to the signature of a signal previously received from the same transmitter and stored in memory. Ideally, it is preferable that the correlation remain equal to 1. The correlation curve 306 generally indicates that the correlation decreases with the decrease in sample size. At the far left, where the sample size is 4096 samples (representing the longest duration of the signal being sampled), the correlation is equal to about 1. As the sample size reduces (i.e., the duration of the signal that is sampled reduces), the correlation value also decreases. However, even at a small sample sizes, e.g., 64, the correlation deteriorates to 0.9900 from 0.9999 (at sample size of 4096). FIG. 3B shows a bar graph depicting the relationship between the correlation and the sampling rate at which the samples of the signal 112 are collected. FIG. 3B shows that when the sampling rate is halved (from 20 Mbps to 10 Mbps), the correlation reduces from 0.9999 to 0.9975. Thus, with reduced sampling rate (which, in turn reduces the number of samples for a given duration of signal) the correlation deterioration is not considerable. As a result, the one or more processors 128 can capture only a portion of the pulse of the waveform 200 to determine the signature. In the example shown in FIG. 2B, the one or more processors 128 can capture a n number of samples starting at the leading edge 206 of the pulse to the sample 210. The value of n can have a value between 12 and 4096, for example, at a sampling rate of 10 Mbps to 20 Mbps. It should be noted that the examples are based upon WiFi signals and results may vary with other electromagnetic signals.

Figure 4:
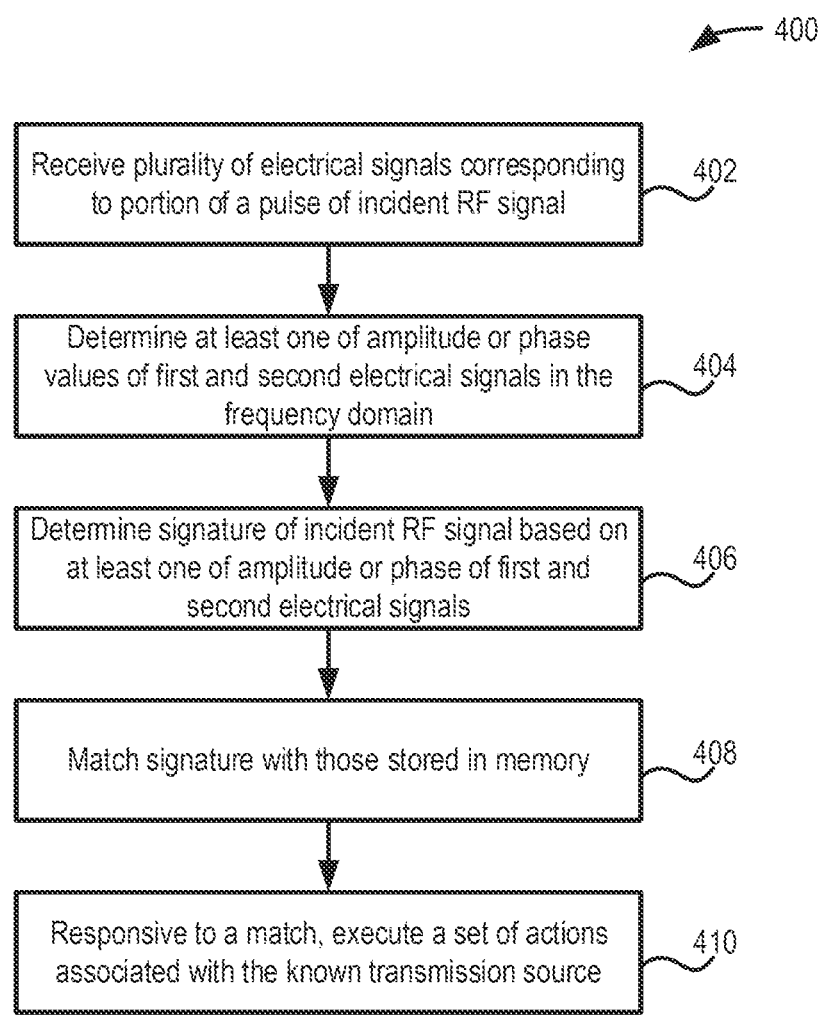
FIG. 4 shows a flow diagram of a process for determining an identity of a transmission source from a received signal.

FIG. 4 shows a flow diagram of a process 400 for determining an identity of a transmission source from a received signal. At least a portion of the process can be executed by the one or more processors 128 (FIG. 1). At least a portion of instructions executed by the one or more processors 128 can be stored in a computer-readable non-volatile storage medium such as, for example, the memory unit 126 (FIG. 1). The process 400 includes receiving a plurality of electrical signals corresponding to a portion of a pulse of an incident RF signal (402). As discussed above in relation to FIG. 1, the plurality of signals can correspond to two or more of the component signals S1$u$, S1$v$, S2$u$, and S2$v$ that have been down-converted and digitized by the down converters 120$a$-$d$ and ADCs 122$a$-$d$. In instances where the receiver 106 includes more than two antennas, the plurality of electrical signals can correspond to the digitized signals generated by those antennas in response to an incident RF signal. The one or more processors 128 can further consider only a portion of the pulse of the RF signal. For example, as discussed above in relation to FIGS. 3A-4B, the one or more processors 128 can consider a portion of the pulse of the waveform 200 corresponding to the RF signal 112. The portion can include n samples of the pulse, where n is less than the number of samples that represent the entire pulse. In some examples, the value of n can be between 12 and 4096 for example at a sampling rate between 10 Mbps and 20 Mbps.

The process 400 further includes determining at least one of amplitude or phase values of a first electrical signal and a second electrical signal from the plurality of electrical signals in the frequency domain (404). The first electrical signal and the second electrical signal can correspond to any two signals from the digitized component signals S1$u$, S1$v$, S2$u$, and S2$v$. For example, the first and second electrical signals can correspond to S1$u$ and S1$v$ signals associated with the same first receiver antenna 116. In another example, the first and the second electrical signals can correspond to S1$u$ and S2$v$ signals corresponding to two different antennas. Generally, the first and the second electrical signals can correspond to any two of the six signal pairs that can be formed from the component signals S1$u$, S1$v$, S2$u$, and S2$v$. If the selected pair of signals are associated with the same antenna, then the subsequent Stokes parameters or Jones vectors determination can correspond to polarization information. If the selected pair of signals are associated with different antennas, then the subsequent Stokes parameters and Jones vectors determination can correspond to phase coherence information.

The one or more processors 128 can transform the first and the second electrical signals from the time domain to the frequency domain based on a transformation function. For example, the one or more processors 128 can use Fast Fourier Transform (FFT) or Discrete Fourier Transform (DFT) to transform the first and the second electrical signals having N samples from the time domain to k frequency bins in the frequency domain. Each component signal can be a complex signal received by the corresponding antenna. The frequency domain representation $X_i[k]$ of the signal $x_i[n]$ can be expressed as follows:

$$X_i[k] = \sum_{n=0}^{N-1} x_i[n] e^{-j2\pi kn/N}$$

The one or more processors 128 can utilize the above expression to generate the frequency domain representation $X_1[k]$ of the first electrical signal and the frequency domain representation $X_2[k]$ of the second electrical signal. The one or more processors 128 can then determine the Stokes parameters for each frequency bin based on the following expression for the Stokes vector:

$$\begin{bmatrix} S_0[k] \\ S_1[k] \\ S_2[k] \\ S_3[k] \end{bmatrix} = \begin{bmatrix} |X_1[k]|^2 + |X_2[k]|^2 \\ |X_1[k]|^2 - |X_2[k]|^2 \\ 2\mathrm{Re}(X_1[k]X_2[k]^*) \\ -2\mathrm{Im}(X_1[k]X_2[k]^*) \end{bmatrix}$$

The first Stokes parameter $S_0[k]$ is related to the amplitude, while the second, third, and fourth stokes parameters: $S_1[k]$, $S_2[k]$, and $S_3[k]$ are related to the phase relationship between the frequency domain representations of the first and second electrical signals. It should be noted that the Stokes parameters are determined in each frequency bin k. In some implementations, the first Stokes parameter representing the amplitude can be ignored. In some such instances, only the phase relationship of the first and the second electrical signals is considered. In some other instances, all the Stokes parameters can be taken into account to determine a signature of the incident RF signal.

Figure 5:
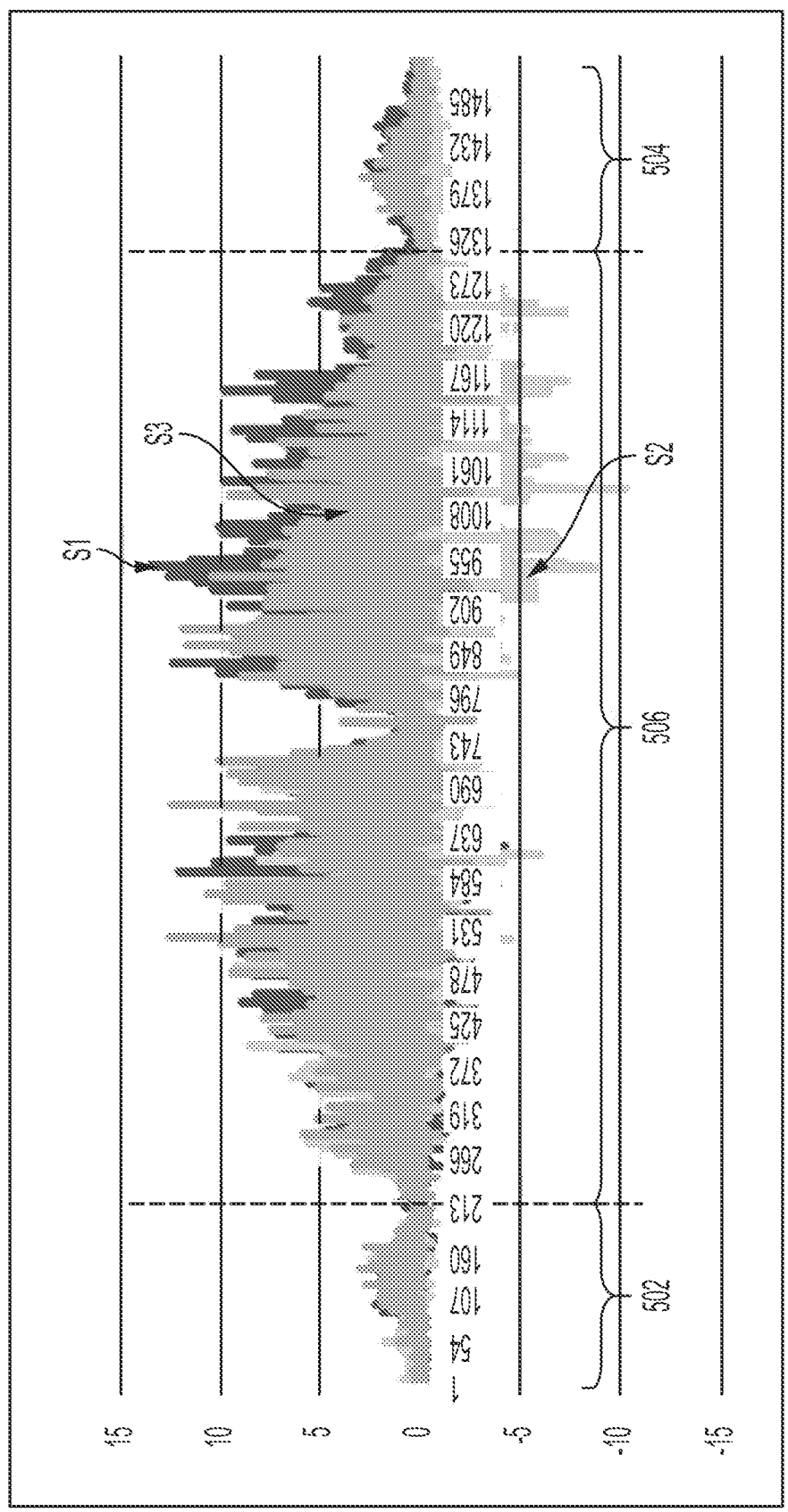
FIG. 5 shows an example chart of the values of Stokes parameters over k frequency bins.

The process 400 further includes determining a signature of the incident RF signal based on at least one of the amplitude or phase of the first and second electrical signals (406). In one example, the one or more processors 128 can determine a signature of the incident RF signal based on the Stokes parameters. FIG. 5 shows an example chart of the values of the Stokes parameters S1[k], S2[k], and S3[k] (hereinafter referred to as S1, S2, and S3) over k frequency bins shown on the x-axis. In some instances, the signature of the incident RF signal can be determined based on the Stokes parameters over all the k frequency bins (also referred to as "a first set of frequency bins"). However, in some instances only a subset of the frequency bins can be considered. For example, a group of low-frequency frequency bins or a group of high-frequency frequency bins or both the group of low-frequency bins and the group of high frequency bins can be removed from the k frequency bins leaving a second set of frequency bins. FIG. 5 shows a first group of frequency bins 502 and a second group of frequency bins 504 can be removed. The first group of frequency bins 502 correspond to a group of low-frequency frequency bins and the second group of frequency bins 504 correspond to a group of high-frequency frequency bins. The second set of frequency bins 506 are positioned between the first group of frequency bins 502 and the second group of frequency bins 504. While FIG. 5 shows removing both the first group of frequency bins 502 and the second group of frequency bins 504, it is understood that the one or more processors 128 may remove only one of the first group of frequency bins 502 and the second group of frequency bins 504.

By removing low and/or high frequency bins, the one or more processors 128 can improve the computation speed of determining the signature of an incident RF signal. Typically, the computation time needed to determine the signature can be an increasing function of the number of frequency bins. Therefore, by removing a group of frequency bins, the computational time can be reduced. This reduction in computational time can further enhance the speed with which the one or more processors 128 can make a determination whether the incident RF signal is from a known transmitter. The reduction in number of frequency bins may not significantly impact the accuracy of the determination. Removing low and high frequency bins may also improve the reliability of the signature. In particular, the process of transforming the incident RF signal from the time domain to the frequency domain can, in some instances, introduce artifacts in low and high frequencies in the frequency domain representation of the signal. The artifacts can be due to spectral leakage. These artifacts can be carried over to the Stokes parameters also at the high and/or low frequencies and may impact the quality of the Stokes parameters, and consequently may impact the accuracy of the signature. Thus, removing a group of high and/or low frequency bins can reduce the impact of those artifacts on the values of the Stokes parameters. As a result, by removing the low and/or high frequency bins, the one or more processors 128 not only reduces the computational complexity of determining the signature, but does so without sacrificing, and in some cases improving, the quality of the Stokes parameters. In some implementations, the one or more processors 128 can remove 25 percent of the frequency bins, retaining 75 percent of the frequency bins for signature determination. The 25 percent of the removed frequency bins can be equally or unequally divided among the high and low frequency bins. In some examples, the percentage of the total frequency bins retained can vary between 25 to 90 percent.

While removal of the frequency bins discussed above is shown with respect to the Stokes parameters chart, it is understood that the removal of frequency bins can be carried out prior to the determination of the Stokes parameters. That is, the removal of the frequency bins can be carried out on the frequency domain representation of the first and second electrical signals. The Stokes parameters can then be determined from the first and the second electrical signals over the remaining second set of frequency bins.

Referring again to FIG. 5, in some examples, the number of frequency bins in the frequency domain representation of the incident RF signal can be less than a threshold value desired for reliable signature generation. In such examples, the one or more processors 128 can add frequency bins on one or both sides of the frequency domain representation of the incident RF signal. In such instances, the added frequency bins can have energy levels that mirror the energy levels of the originally present adjacent frequency bins.

Figure 6:
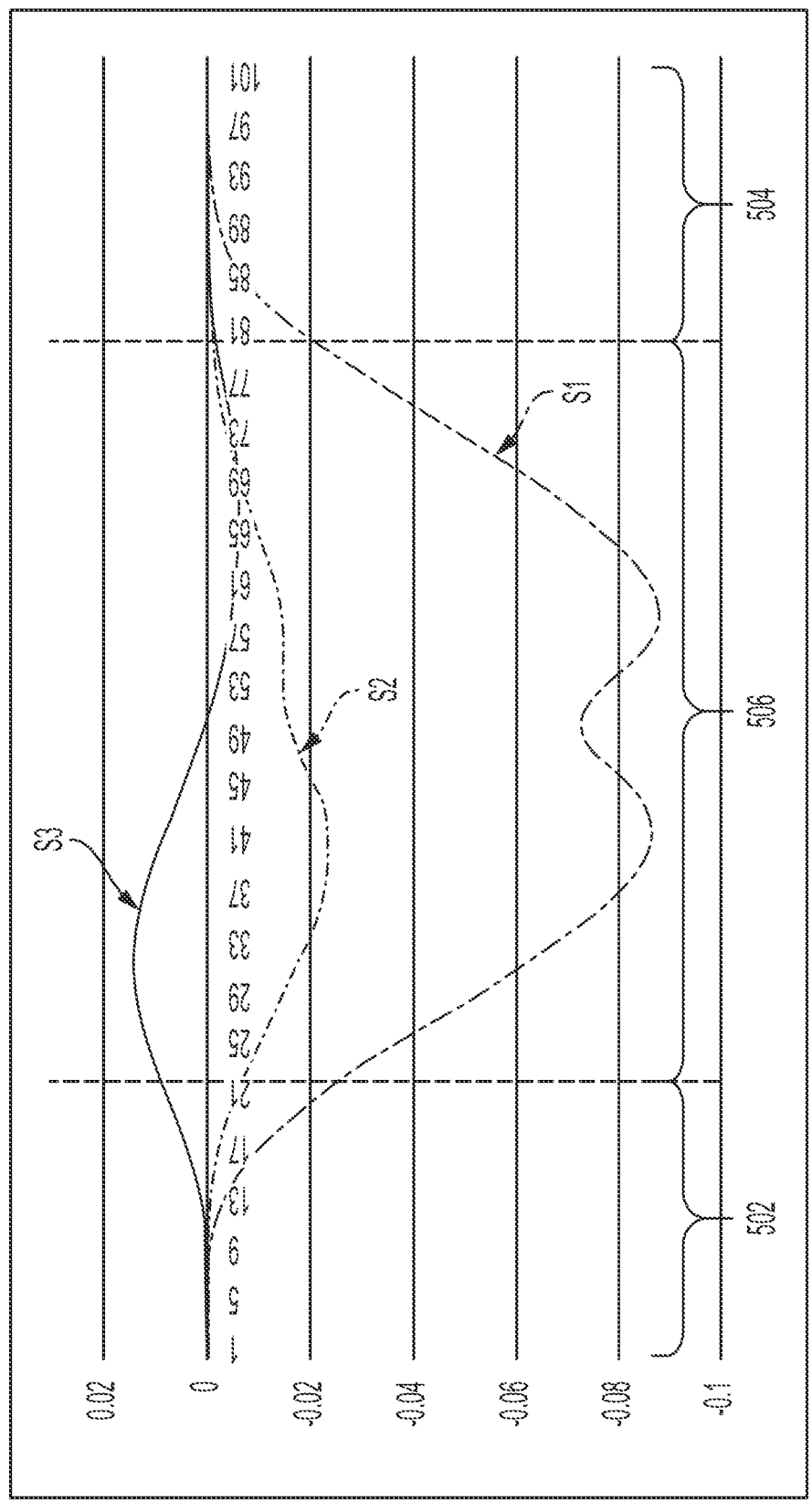
FIG. 6 shows example averaged Stokes parameters.

In some examples, at least one of the Stokes parameters can be averaged over the frequency bins. Referring to FIG. 5, the one or more processors 128 can determine an average of the Stokes parameters S1, S2, and S3 over the second set of frequency bins 506. In one approach, the one or more processors 128 can determine a fixed average of the Stokes parameters over a set of frequency bins. For example, for the first three bins, the one or more processors 128 can determine the average value of a Stokes parameter, and then assign the average value to each of the three frequency bins. The one or more processors 128 can continue in a similar manner to every subsequent set of three frequency bins until the last frequency bins is reached. The one or more processors 128 can carry out the same process for the other two Stokes parameters to generate average values of the stokes parameters. In another approach, the one or more processors 128 can determine a moving average of a Stokes parameters over the frequency bins. For example, the one or more processors 128 can select a window of a number of frequency bins. At the left most position of the bin, the one or more processors 128 can assign to that frequency bin the value of the average of the frequency bins within the window. The one or more processors 128 can then move the window one frequency bin forward or backward and repeat the process until the final frequency bin is reached. Other averaging methodologies may also be used. FIG. 6 shows example averaged Stokes parameters. The one or more processors 128 can consider the values of the averaged Stokes parameters only within the second set of frequency bins 506, as discussed above in relation to FIG. 5.

The one or more processors 128 can determine the signature of the incident RF signal as the set the values of the Stokes parameters (shown in FIG. 5 or the averaged Stokes parameter shown in FIG. 6) within the second set of frequency bins 506. In some implementations, the one or more processors 128 store the values of the Stokes parameters in a two dimensional array, where the number of columns is equal to the number of frequency bins and the number of rows is equal to the number of Stokes parameters considered. Of course, a transpose of the matrix also can be stored. For example, if the second set of frequency bins is equal to 100, and the Stokes parameters include S1, S2, and S3, the one or more processors 128 can store a 3×100 array as the signature of the incident RF signal 112.

In some examples, the one or more processors 128 can determine the signature of the incident RF signal 112 based on curves formed on a Poincare sphere. In particular, the Stokes parameters S1, S2, and S3 can be treated as coordinates on a Poincare sphere, where each point on the Poincare sphere corresponds to values of the Stokes parameters in a single frequency bin. As there are several frequency bins, the values of the Stokes parameters over the several frequency bins can form a curve on the Poincare sphere surface. The one or more processors 128 can store the curves of known or trusted transmission sources in memory unit 126. The one or more processors 128 can then determine the curve on the Poincare sphere from the Stokes parameter of the incident RF signal, as discussed above. The one or more processors 128 can then match the curves of the incident RF signal with the curves stored in the memory unit 126 to determine if the curves match.

Referring again to FIG. 4, the process 400 includes matching the signature of the incident RF signal with those stored in memory (408). The one or more processors 128 can store signatures of known or trusted transmission sources in the memory unit 126. Once the signature of the incident RF signal is determined, the one or more processors 128 can compare the signature with one or more stored signatures to determine whether the incident RF signal is from a known or trusted transmission source. In one example, determining whether the signature of the incident RF signal matches a stored signature includes determining a coefficient of correlation between the signatures. For example, the one or more processors 128 can determine the coefficient of correlation between the signature of the incident RF signal and a stored signature, and if the coefficient of correlation exceeds a threshold value, the one or more processors 128 can take appropriate action. In some instances, the correlation can be determined by determining a dot product between the signature of the incident RF signal and the stored RF signal. However, the one or more processors 128 can utilize and statistical tool to determine the correlation. In some instances, the length of the signature of the incident RF signal can be different from the length of the stored signature. Here length can refer to the number of frequency bins (e.g., the second set of frequency bins) over which the signatures are determined. In such instances, the one or more processors 128 can align the center frequency bin of the two signatures before performing the correlation. In some such instances, the one or more processors 128 can determine the center frequency bins based on the frequency domain representation of the signals corresponding to the signatures.

Figure 7:
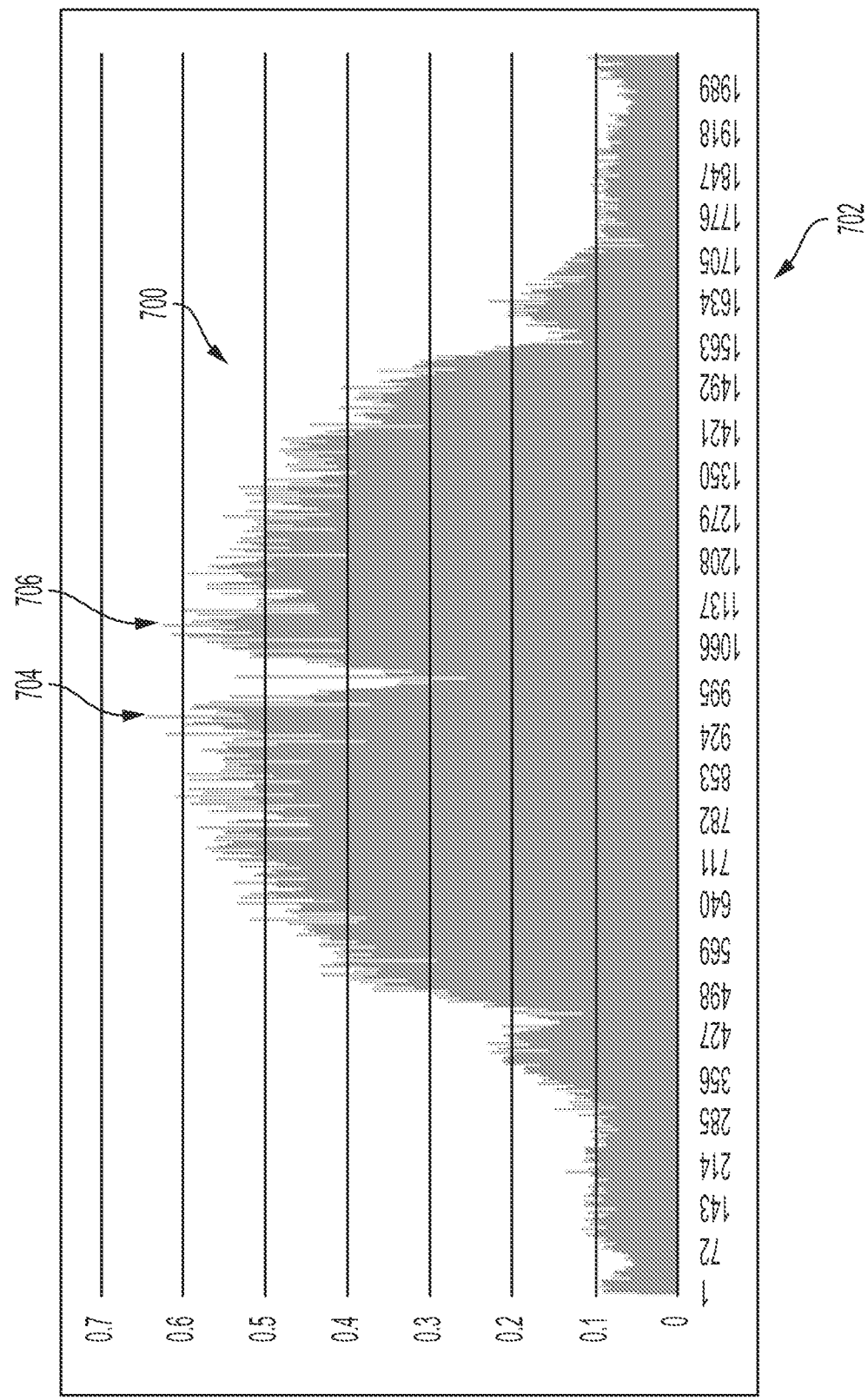
FIG. 7 shows determining a center frequency bin in an example frequency domain representation of the incident RF signal.

In some instances, determining a center frequency bin can be difficult. In particular, the center frequency bin may not be the one that has the peak energy in the frequency domain. FIG. 7 shows determining a center frequency bin in an example frequency domain representation of the incident RF signal. The frequency domain representation 700 shows frequency bins on the x-axis 702. The one or more processors 128 can determine two frequency bins having the highest energy, and determining the center frequency bin to be the frequency bin positioned between the two frequency bins and substantially equidistant from the two frequency bins. For example, the one or more processors 128 can determine a first frequency bin 704 and a second frequency bin 706 having the highest two energy levels. The one or more processors 128 can determine a frequency bin that is between the first frequency bin 704 and the second frequency bin 706 and that is substantially equidistant from the first frequency bin 704 and the second frequency bin 706. The one or more processors 128 can use this center frequency bin as a center of the signature corresponding to the signal shown in FIG. 7. The one or more processors 128 can similarly determine the center frequency bin of the other signature. In some instances, when storing signatures, the one or more processors 128 can store not only the signature itself, but also the determined center frequency bin. In this manner, when comparing an incoming signature with the stored signature, the one or more processors 128 can determine the center frequency bin of the incoming signature with the stored center frequency bin of the stored signature before determining the coefficient of correlation. The stored signatures may also be stored with associated identities of the transmission sources. Thus, if there is a match, the one or more processors 128 can readily determine the identity of the transmission source from which the incident RF signal is transmitted.

In some instances, determining a center frequency bin can be determined based on the beginning frequency bin and the end frequency bin of the main lobe of the frequency domain representation shown in FIG. 7. The beginning frequency bin and the end frequency bin can be determined, for example, by determining the frequency bins at which a moving average of the magnitude of the frequency domain representation goes above or falls below specified threshold values. The center frequency bin can then be determined as the frequency bin that is between and substantially equidistant from the beginning frequency bin and the end frequency bin.

The coefficients of correlation generated by the correlation operation can be modified to be between the values 0 and 1, where 0 can represent no correlation, and 1 can represent a perfect match. The user can set a threshold value which when exceeded by the result of the correlation can indicate that the signatures match, and that the incident RF signal corresponding to the signature is from a known or trusted transmission source. In some examples, the threshold value can be in the range of 0.8000 to 0.9999.

The process 400 includes executing at least one action from a set of actions associated with a known transmission source in response to determining that the incident RF signal is from the known transmission source (410). The set of actions can include, for example, demodulating the modulated data included in the incident RF signal, annunciating, at the receiver 106 that the incident RF signal is from a known transmission source, along with the identity of the known transmission source. Additionally, the set of actions can include authentication of known sources without further demodulating the signal. Additionally, the set of actions can include allowing the received signal to be transmitted to a network. Additionally, the set of actions could include alarming the presence of a known signal from critical monitoring sources. Additionally, the set of actions could include identifying the presence of persistent sources of interest, new or known.

In instances where the one or more processors 128 determines that the signature of the incident RF signal does not match any stored signature, the one or more processors 128 can take a second set of actions, which can include, refraining from demodulating the incident RF signal, annunciating that an unknown or unauthorized transmission source has been detected, disallowing the received signal from being transmitted to a network, etc. The process 400 may also execute a user interface that can allow the system or a user to receive an indication of a signature match or no-match. Further, user interface can allow the system or the user to indicate to the one or more processors 128 to store the signature in the memory unit 126 even if there is no match, and in affect treat the transmission source as a trusted or known transmission source. This can allow the one or more processors 128 to build a bank of signatures of trusted or known transmission sources in the memory unit 126.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The discussion herein describes several aspects of the apparatus that can be implemented separately or in combination with other aspects of the disclosure without departing from the disclosure. The following lists a non-limiting set of aspects of the display device should not be confused with the claims.

Aspect 1: This aspect includes a method for identifying incident RF signals at a receiver, including receiving, via at least one antenna, a plurality of electrical signals corresponding to a portion of a pulse of an incident RF signal, the portion of the pulse of the incident RF signal having a duration that is less than a duration of a single pulse of the incident RF signal; determining at least one of amplitude or phase values of a first electrical signal and a second electrical signal in phase coherence with the first electrical signal, from the plurality of electrical signals, in a plurality of frequency bins in the frequency domain; determining a signature of the incident RF signal based on at least one of amplitude or phase of the first electrical signal and the second electrical signal in each of the plurality of frequency bins; determining that the incident RF signal is from a known transmission source based on a match between the signature of the incident RF signal and at least one signature stored in memory; and executing, responsive to determining that the incident RF signal is from a known transmission source, at least one action from a set of actions associated with the known transmission source.

Aspect 2: The method according to any one of Aspects 1-12, wherein the set of actions associated with the known transmission source includes, demodulating the modulated data included in the incident RF signal and annunciate at the receiver that the incident RF signal is from a known transmission source.

Aspect 3: The method according to any one of Aspects 1-12, further comprising: transforming the first electrical signal and the second electrical signal into corresponding frequency domain representations over a first set of frequency bins; and removing at least one of a group of low frequency bins or a group of high frequency bins from the first set of frequency bins to generate a second set of frequency bins; and selecting the plurality of frequency bins, over which the signature of the incident RF signal is determined, as the second set of frequency bins.

Aspect 4: The method according to any one of Aspects 1-12, wherein a center frequency bin of the plurality of frequency bins aligns with a center frequency bin of the first set of frequency bins.

Aspect 5: The method according to any one of Aspects 1-12, further comprising: determining the signature of the RF signal based on generating one of Stokes parameters or Jones vectors from at least one of amplitude and phase values of the first electrical signal and the second electrical signal in each frequency bin of the plurality of frequency bins.

Aspect 6: The method according to any one of Aspects 1-12, further comprising: determining the signature of the RF signal based on a summation or an average of one of Stokes parameters or Jones vectors over the plurality of frequency bins.

Aspect 7: The method according to any one of Aspects 1-12, wherein determining that the incident RF signal is from a known transmission source based on the match between the signature of the incident RF signal and the at least one signature stored in memory includes determining that a correlation between the signature of the incident RF signal and the at least one signature stored in memory has a correlation coefficient that is greater than a threshold value.

Aspect 8: The method according to any one of Aspects 1-12, further comprising: determining the correlation between the signature of the incident RF signal and the at least one signature stored in memory includes aligning a center frequency bin of the signature of the incident RF signal and a center frequency bin of the at least one signature stored in memory.

Aspect 9: The method according to any one of Aspects 1-12, wherein the center frequency bin of the signature of the incident RF signal is determined based at least on determining two frequency bins having the highest two magnitudes in the second set of frequency bins, and setting the center frequency bin as a frequency bin that is between the two frequency bins and substantially equidistant from the two frequency bins.

Aspect 10: The method according to any one of Aspects 1-12, wherein the at least one antenna includes a first antenna and a second antenna spatially separated from the first antenna, and wherein the first electrical signal corresponds to a component of a signal generated by the first antenna responsive to the incident RF signal and the second electrical signal corresponds to a component of a signal generated by the second antenna responsive to the incident RF signal.

Aspect 11: The method according to any one of Aspects 1-12, wherein the at least one antenna includes a single dual-polarized antenna, and wherein the first electrical signal and the second electrical signal correspond to polarized signal components the single dual-polarized antenna in response to the incident RF signal.

Aspect 12: The method according to any one of Aspects 1-12, further comprising: determining the signature of the incident RF signal further based on at least one of signal bandwidth and polarization coordinates of a Poincare sphere of the first electrical signal and the second electrical signal in each of the plurality of frequency bins.

Aspect 13: This aspect includes a method for identifying incident RF signals at a receiver, comprising: receiving, via at least one antenna, a plurality of electrical signals corresponding to an incident RF signal; transforming the first electrical signal and the second electrical signal, which is in phase coherence with the first electrical signal, into corresponding frequency domain representations over a first set of frequency bins; removing at least one of a group of low frequency bins or a group of high frequency bins from the first set of frequency bins to generate a plurality of frequency bins; determining a signature of the incident RF signal based on at least one of amplitude or phase of the first electrical signal and the second electrical signal in each of the plurality of frequency bins; determining that the incident RF signal is from a known transmission source based on a match between the signature of the incident RF signal and at least one signature stored in memory; and executing, responsive to determining that the incident RF signal is from a known transmission source, at least one action from a set of actions associated with the known transmission source.

Aspect 14: The method according to any one of Aspects 13-24, wherein the set of actions associated with the known transmission source includes, demodulating the modulated data included in the incident RF signal and annunciate at the receiver that the incident RF signal is from a known transmission source.

Aspect 15: The method according to any one of Aspects 13-24, wherein a center frequency bin of the plurality of frequency bins aligns with a center frequency bin of the first set of frequency bins.

Aspect 16: The method according to any one of Aspects 13-24, further comprising: determining the signature of the RF signal based on generating one of Stokes parameters or Jones vectors from at least one of amplitude and phase values of the first electrical signal and the second electrical signal in each frequency bin of the plurality of frequency bins.

Aspect 17: The method according to any one of Aspects 13-24, further comprising: determining the signature of the RF signal based on a summation or an average of one of Stokes parameters or Jones vectors over the plurality of frequency bins.

Aspect 18: The method according to any one of Aspects 13-24, wherein determining that the incident RF signal is from a known transmission source based on the match between the signature of the incident RF signal and the at least one signature stored in memory includes determining that a correlation between the signature of the incident RF signal and the at least one signature stored in memory has a correlation coefficient that is greater than a threshold value.

Aspect 19: The method according to any one of Aspects 13-24, further comprising: determining the correlation between the signature of the incident RF signal and the at least one signature stored in memory includes aligning a center of the signature of the incident RF signal and a center of the at least one signature stored in memory.

Aspect 20: The method according to any one of Aspects 13-24, wherein the center frequency bin of the signature of the incident RF signal is determined based at least on determining two frequency bins having the highest two magnitudes in the second set of frequency bins, and setting the center frequency bin as a frequency bin that is between the two frequency bins and substantially equidistant from the two frequency bins.

Aspect 21: The method according to any one of Aspects 13-24, the at least one antenna includes a first antenna and a second antenna spatially separated from the first antenna, and wherein the first electrical signal corresponds to a component of a signal generated by the first antenna responsive to the incident RF signal and the second electrical signal corresponds to a component of a signal generated by the second antenna responsive to the incident RF signal.

Aspect 22: The method according to any one of Aspects 13-24, wherein the at least one antenna includes a single dual-polarized antenna, and wherein the first electrical signal and the second electrical signal correspond to polarized components of a signal of the single dual-polarized antenna in response to the incident RF signal.

Aspect 23: The method according to any one of Aspects 13-24, wherein the plurality of electrical signals correspond to a portion of a pulse of the incident RF signal, the portion of the pulse of the incident RF signal having a duration that is less than a duration of a single pulse of the incident RF signal.

Aspect 24: The method according to any one of Aspects 13-24, further comprising: determining the signature of the incident RF signal further based on at least one of signal bandwidth and polarization coordinates of a Poincare sphere of the first electrical signal and the second electrical signal in each of the plurality of frequency bins.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for identifying incident RF signals at a receiver, comprising:
   receiving, via at least one antenna, a plurality of electrical signals corresponding to a portion of a pulse of an incident RF signal, the portion of the pulse of the incident RF signal having a duration that is less than a duration of a single pulse of the incident RF signal;
   determining at least one of amplitude or phase values of a first electrical signal and a second electrical signal in phase coherence with the first electrical signal, from the plurality of electrical signals, in a plurality of frequency bins in the frequency domain;
   determining a signature of the incident RF signal based on at least one of amplitude or phase of the first electrical signal and the second electrical signal in each of the plurality of frequency bins;
   determining that the incident RF signal is from a known transmission source based on a match between the signature of the incident RF signal and at least one signature stored in memory; and
   executing, responsive to determining that the incident RF signal is from a known transmission source, at least one action from a set of actions associated with the known transmission source.

2. The method of claim 1, wherein the set of actions associated with the known transmission source includes, demodulating modulated data included in the incident RF signal and annunciate at the receiver that the incident RF signal is from a known transmission source.

3. The method of claim 1, further comprising:
   transforming the first electrical signal and the second electrical signal into corresponding frequency domain representations over a first set of frequency bins;
   removing at least one of a group of low frequency bins or a group of high frequency bins from the first set of frequency bins to generate a second set of frequency bins; and
   selecting the plurality of frequency bins, over which the signature of the incident RF signal is determined, as the second set of frequency bins.

4. The method of claim 3, wherein a center frequency bin of the plurality of frequency bins aligns with a center frequency bin of the first set of frequency bins.

5. The method of claim 1, further comprising:
   determining the signature of the incident RF signal based on generating one of Stokes parameters or Jones vectors from at least one of amplitude and phase values of the first electrical signal and the second electrical signal in each frequency bin of the plurality of frequency bins.

6. The method of claim 5, further comprising:
   determining the signature of the incident RF signal based on a summation or an average of one of Stokes parameters or Jones vectors over the plurality of frequency bins.

7. The method of claim 1, wherein determining that the incident RF signal is from a known transmission source based on the match between the signature of the incident RF signal and the at least one signature stored in memory includes determining that a correlation between the signature of the incident RF signal and the at least one signature stored in memory has a correlation coefficient that is greater than a threshold value.

8. The method of claim 7, further comprising:
   determining the correlation between the signature of the incident RF signal and the at least one signature stored in memory includes aligning a center frequency bin of the signature of the incident RF signal and a center frequency bin of the at least one signature stored in memory.

9. The method of claim 8, wherein the center frequency bin of the signature of the incident RF signal is determined based at least on determining two frequency bins having the highest two magnitudes in the plurality of frequency bins, and setting the center frequency bin as a frequency bin that is between the two frequency bins and substantially equidistant from the two frequency bins.

10. The method of claim 1, wherein the at least one antenna includes a first antenna and a second antenna spatially separated from the first antenna, and wherein the first electrical signal corresponds to a component of a signal generated by the first antenna responsive to the incident RF signal and the second electrical signal corresponds to a component of a signal generated by the second antenna responsive to the incident RF signal.

11. The method of claim 1, wherein the at least one antenna includes a single dual-polarized antenna, and wherein the first electrical signal and the second electrical signal correspond to polarized signal components the single dual-polarized antenna in response to the incident RF signal.

12. The method of claim 11, further comprising:
   determining the signature of the incident RF signal further based on at least one of signal bandwidth and polarization coordinates of a Poincare sphere of the first electrical signal and the second electrical signal in each of the plurality of frequency bins.

13. A method for identifying incident RF signals at a receiver, comprising:
   receiving, via at least one antenna, a plurality of electrical signals corresponding to an incident RF signal, the plurality of electrical signals including a first electrical signal and a second electrical signal;
   transforming the first electrical signal and the second electrical signal, which is in phase coherence with the first electrical signal, into corresponding frequency domain representations over a first set of frequency bins;
   removing at least one of a group of low frequency bins or a group of high frequency bins from the first set of frequency bins to generate a plurality of frequency bins;
   determining a signature of the incident RF signal based on at least one of amplitude or phase of the first electrical signal and the second electrical signal in each of the plurality of frequency bins;
   determining that the incident RF signal is from a known transmission source based on a match between the signature of the incident RF signal and at least one signature stored in memory; and
   executing, responsive to determining that the incident RF signal is from a known transmission source, at least one action from a set of actions associated with the known transmission source.

14. The method of claim 13, wherein the set of actions associated with the known transmission source includes, demodulating modulated data included in the incident RF signal and annunciate at the receiver that the incident RF signal is from a known transmission source.

15. The method of claim 13, wherein a center frequency bin of the plurality of frequency bins aligns with a center frequency bin of the first set of frequency bins.

16. The method of claim 13, further comprising:
   determining the signature of the incident RF signal based on generating one of Stokes parameters or Jones vectors from at least one of amplitude and phase values of the first electrical signal and the second electrical signal in each frequency bin of the plurality of frequency bins.

17. The method of claim 16, further comprising:
   determining the signature of the incident RF signal based on a summation or an average of one of Stokes parameters or Jones vectors over the plurality of frequency bins.

18. The method of claim 13, wherein determining that the incident RF signal is from a known transmission source based on the match between the signature of the incident RF signal and the at least one signature stored in memory includes determining that a correlation between the signature of the incident RF signal and the at least one signature stored in memory has a correlation coefficient that is greater than a threshold value.

19. The method of claim 18, further comprising:
   determining the correlation between the signature of the incident RF signal and the at least one signature stored in memory includes aligning a center frequency bin of the signature of the incident RF signal and a center frequency bin of the at least one signature stored in memory.

20. The method of claim 19, wherein the center frequency bin of the signature of the incident RF signal is determined based at least on determining two frequency bins having the highest two magnitudes in the plurality of frequency bins, and setting the center frequency bin as a frequency bin that is between the two frequency bins and substantially equidistant from the two frequency bins.

21. The method of claim 13, wherein the at least one antenna includes a first antenna and a second antenna spatially separated from the first antenna, and wherein the first electrical signal corresponds to a component of a signal generated by the first antenna responsive to the incident RF signal and the second electrical signal corresponds to a component of a signal generated by the second antenna responsive to the incident RF signal.

22. The method of claim 13, wherein the at least one antenna includes a single dual-polarized antenna, and wherein the first electrical signal and the second electrical signal correspond to polarized components of a signal of the single dual-polarized antenna in response to the incident RF signal.

23. The method of claim 13, wherein the plurality of electrical signals correspond to a portion of a pulse of the incident RF signal, the portion of the pulse of the incident RF signal having a duration that is less than a duration of a single pulse of the incident RF signal.

24. The method of claim 22, further comprising:
   determining the signature of the incident RF signal further based on at least one of signal bandwidth and polarization coordinates of a Poincare sphere of the first electrical signal and the second electrical signal in each of the plurality of frequency bins.

* * * * *